United States Patent [19]

Thünker

[11] Patent Number: 5,456,128
[45] Date of Patent: Oct. 10, 1995

[54] CAM OSCILLATING DRIVE IN A PRINTING MACHINE WITH KINETIC/POTENTIAL ENERGY STORAGE MEANS FOR DAMPING UNDESIRED OSCILLATIONS

[75] Inventor: Norbert Thünker, Hirschberg, Germany

[73] Assignee: Heidelberger Druckmaschinen AG, Heidelberg, Germany

[21] Appl. No.: 191,759

[22] Filed: Jan. 31, 1994

Related U.S. Application Data

[63] Continuation of Ser. No. 703,467, May 21, 1991, abandoned, which is a continuation-in-part of Ser. No. 549,597, Jul. 6, 1990, abandoned.

[30] Foreign Application Priority Data

Jul. 6, 1989 [DE] Germany ............................ 39 22 186.5

[51] Int. Cl.$^6$ ............................ B41F 21/04; F16H 21/28; F16H 33/14
[52] U.S. Cl. ................................................ 74/53; 101/409
[58] Field of Search ................................. 74/53, 54, 113; 101/113, 218, 245, 246, 409

[56] References Cited

U.S. PATENT DOCUMENTS

| | | | |
|---|---|---|---|
| 828,064 | 8/1906 | Slater | 74/53 X |
| 2,266,081 | 12/1941 | Rogers | 74/569 |
| 2,692,509 | 10/1954 | Gibson | 74/53 |
| 3,172,295 | 3/1965 | Hrdina | 74/53 |
| 3,246,601 | 4/1966 | Fischer | 74/54 |
| 3,272,022 | 9/1966 | Spinner | 74/53 |
| 3,377,882 | 4/1968 | Shrempp | 74/567 |
| 3,431,843 | 3/1969 | Kaneko et al. | 101/218 |
| 3,831,210 | 8/1974 | Ow | 280/414.5 |
| 3,861,303 | 6/1975 | Dorn, Jr. | 101/227 |
| 3,964,357 | 6/1976 | Fetzer et al. | 74/53 X |
| 4,171,830 | 10/1979 | Metz | 280/711 |
| 4,215,588 | 8/1980 | Komon et al. | 74/113 |
| 4,399,750 | 8/1983 | O'Brien | 101/245 |
| 4,583,728 | 4/1986 | Mathes | 74/54 X |
| 4,660,482 | 4/1987 | Skogward | 112/241 |
| 4,901,821 | 2/1990 | Robbins | 74/53 X |
| 5,076,165 | 12/1991 | Pollich | 101/409 |
| 5,398,607 | 3/1995 | Fricke et al. | 101/409 |

FOREIGN PATENT DOCUMENTS

| | | |
|---|---|---|
| 608045 | 12/1934 | Germany. |
| 22638 | 1/1962 | Germany ............................ 74/53 |
| 1263434 | 3/1968 | Germany. |
| 1436529 | 3/1969 | Germany. |
| 2022245 | 11/1970 | Germany. |
| 1611293 | 12/1970 | Germany. |

(List continued on next page.)

OTHER PUBLICATIONS

Garrison and Kroeker, "Paper Feed Apparatus" Sep. 1979, vol. 22, No. 4, IBM Technical Disclosure Bulletin, pp. 1321–1322.

Cruther et al., "Pin Set Mechanism", IBM Tech. Discl. Aug. 1973, p. 677.

Schnarbach, Kurt, "Federanordnungen an krafschlissigen periodischen cetrieben", Werkstatttechnik und Maschinenbau vol. 43, Book 3/55, pp. 102–105.

Primary Examiner—Charles A. Marmor
Assistant Examiner—Khoi Q. Ta
Attorney, Agent, or Firm—Herbert L. Lerner; Laurence A. Greenberg

[57] ABSTRACT

Cam-oscillating drive which operates to compensate for the cyclically occurring variations in the course of the drive moment by means of at least one cam disc mounted on the drive shaft and a rolling cam follower in engagement with the cam disc, wherein the cam follower has an oscillating part with an oscillating mass driven by the cam follower, and wherein the oscillating part has a curved section that cooperates with a curve roller and a potential energy storage such that the kinetic energy of the oscillating part is stored in the potential energy storage during the deceleration phase, while during the acceleration phase the energy is again drawn from the potential energy storage.

23 Claims, 5 Drawing Sheets

FOREIGN PATENT DOCUMENTS

| | | | |
|---|---|---|---|
| 2618249 | 12/1983 | Germany . | |
| 3626185 | 2/1988 | Germany . | |
| 3736808 | 9/1988 | Germany | 101/409 |
| 3631215 | 2/1989 | Germany . | |
| 113396 | 3/1945 | Sweden | 74/53 |
| 727924 | 4/1980 | U.S.S.R. . | |
| 937847 | 6/1982 | U.S.S.R. . | |
| 267291 | 3/1927 | United Kingdom . | |
| 688478 | 3/1953 | United Kingdom . | |
| 1225679 | 3/1971 | United Kingdom . | |
| 1476452 | 6/1977 | United Kingdom . | |
| 2003091 | 3/1979 | United Kingdom . | |
| 2031097 | 4/1980 | United Kingdom . | |
| 2124319 | 2/1984 | United Kingdom . | |
| 2233728 | 1/1991 | United Kingdom | 74/569 |

5,456,128

CAM OSCILLATING DRIVE IN A PRINTING MACHINE WITH KINETIC/POTENTIAL ENERGY STORAGE MEANS FOR DAMPING UNDESIRED OSCILLATIONS

CROSS-REFERENCE TO RELATED APPLICATION

This application is a continuation of application Ser. No. 07/703,467, filed May 21, 1991, now abandoned, which is a continuation-in-part of application Ser. No 549,597 filed Jul. 6, 1990, now abandoned.

SPECIFICATION

The invention relates to a cam oscillating drive, and more particularly to a cam oscillating drive in which a cyclically occurring fluctuation of drive torques is compensated for by means of energy storage devices which produce torques opposed to the drive torques.

Such a cam-oscillating drive is known from Russian Patent No. SU 727 924. That cam-oscillating drive shows a cam disc mounted on a drive shaft, which is engaged by a rolling cam follower, which drives an oscillating part with an oscillating mass. That oscillating part operates as an elastic part formed as an energy store, such that during a slow-down phase kinetic energy is stored as potential energy which is recovered during an acceleration phase. In that cam-oscillating drive the storage of energy in the oscillating part and its recovery is dependent upon the particular linkage provided for the oscillating part. Any modification in the exchange between potential and kinetic energy is not possible in the arrangement according to the aforesaid reference.

Especially, the aforesaid arrangement is not suitable for an oscillating sheet gripper for a rotary sheet printing machine, especially in regard to the back and forth movements of the gripper.

It is accordingly an object of the invention to provide a cam oscillating drive, which overcomes the hereinafore-mentioned disadvantages of the heretofore-known devices of this general type, and more particularly, to provide an oscillating drive which is simple to manufacture and, on the whole, provides for favorable conditions with respect to the occurring forces, such that there is a reduction in the forces and moments between a drive member and a drive part provided as an oscillating part.

In accordance with the object of the invention, there is provided a cam-oscillating drive which operates to compensate for the cyclically occurring variations in the course of the drive moment by means of at least one cam disc mounted on the drive shaft and a rolling cam follower in engagement with the cam disc, wherein the cam follower has an oscillating part with an oscillating mass driven by the cam follower, and wherein the oscillating part has a curved section that cooperates with a curve roller and a potential energy storage such that the kinetic energy of the oscillating part is stored in the potential energy storage during the deceleration phase, while during the acceleration phase the energy is again drawn from the potential energy storage.

In accordance with another feature of the invention, there is provided a pivot arm having one end supporting the curve roller, pivotally supported at the other end, a draw spring attached to the pivot arm for bracing the curve roller against the curve section, the curve section formed so that the draw spring is relaxed during the acceleration phase of the drive shaft, and tensioned during the deceleration phase of the drive shaft.

In accordance with a further feature of the invention, there is provided an adjusting member coupled to the draw spring for adjusting the tension of the draw spring.

In accordance with again another feature of the invention, there is provided a recessed curve in the cam disc for receiving the cam roller.

In accordance with again a further feature of the invention, there is provided a roller link pivotally attached at one end and supporting the cam roller at the other end, including further linkage means including an intermediate link pivotally attached to the roller link at one end and pivotally attached to the oscillating part at the other end.

In accordance with a concomitant feature of the invention, there are provided first and second cam discs disposed on the drive shaft, and respective first and second cam rollers contacting the first and second cam discs, the first and second cam rollers angularly offset and disposed in respective planes of the cam discs, the cam discs shaped such that as one of the cam rollers rises, the other cam roller correspondingly sinks.

Since the energy storage device is provided to compensate for inertial forces and to store kinetic energy, certain adjustments are necessary. This may be done by a one-time adjustment for constant rotational speed of the machine, or by continuous adjustment or control for variable machine speeds. Firstly, the appropriate adjustment is possible in that the power arm of the lever is variable in length in order to adapt to the rotational speed. Secondly, an appropriate adjustment is permitted in that the spring bias or preload of the spring coefficient is adjustable.

As already mentioned above, the potential energy storage device may be in the form of a mechanical spring. One possible form is that of a leaf spring, with the free end of a connecting member being pivotally connected to the leaf spring and being adjustably mounted on the lever. Among other options it is also possible to employ a torsion bar. The connecting member is adjustable in relation to the power arm of the lever, thereby permitting a suitable adjustment to a variable machine speed.

Adaptation to the speed of the machine can be effected by adjusting the tension of the spring. All possible types of mechanical springs as well as pneumatic spring elements can be used for energy storage devices.

In the case that the motion sequence of the oscillating part differs very greatly between the forward and return strokes, it is necessary, in designing the potential energy storage device and the components located between the potential energy storage device and the oscillating part, to compromise, such that either both ranges of motion are equally optimized or that one range, logically the more important range, is given the best possible power equalization.

The above-described cam oscillating drive is particularly suited for compensating for cyclically occurring fluctuations in the drive torques of an oscillating pre-gripper of a sheet-fed rotary printing machine.

An optimal attainment of the desired properties of the sequence of motions is realized by suitable shaping of a curved section of the oscillating part. This can be attained, for example, from a curve roller mounted on the end of a pivot arm, which at its opposite end of the roller has a pivot point and wherein the pivot arm is connected with a draw spring that maintains the curve roller spring-biased against the curve section. The curve section is shaped such that the spring, during the acceleration phase, is relaxed, and during the deceleration phase is tensioned. Accordingly, the kinetic energy stored in the oscillating parts and the stored spring energy are constantly interchanging. This is caused thereby that the curve roller releases energy stored in the spring to the oscillating part as the roller moves in direction to the cam bearing and energy is drawn from the spring and converted to kinetic energy as the roller moves away from the cam bearing. The corresponding shaping of the curve section is like a trough-shaped recess, which, according to the requirements of the machine, have steeper or flatter flanks. It is also possible to optimize individually and equally both ranges of motion, or to optimize only a single range of motion, especially such that the best possible averaging of energy is afforded the driven machine part. In the points where the oscillating motion is reversed, the curve roller is right at the edge of the trough-shaped curve section wherein the spring energy storage is charged to its maximum, e.g. with the draw spring under maximum tension. At these end points, the slope of the curve can be so far reduced, that in spite of the greater spring tension, only a small amount of moment is acting on the oscillating part in those end points.

In the manner described above, the forces and moments acting between the oscillating part and the cam disc are optimally reduced, which leads to increased equipment life and energy saving. Due to the cam disc oscillating drive, the oscillating part is forcibly steered such as to meet the need of the driven machine elements. This forcible steering requires a strong mechanical connection with the drive shaft, which can be attained by forming the cam disc with a curved recessed groove in which the cam roller of the cam follower is running.

Another way of providing the strong mechanical connection, can be attained by providing two cams that are engaged by a cam follower with two rollers positioned on an angled lever and offset in two planes. Each of these cam follower rollers cooperate with a respective cam disc such that the rise of one roller is coordinated with lowering of the other roller.

The forces that act on the oscillating parts during the deceleration phase on the cam follower roller or rollers are reduced due to the energy storage. As energy storage devices, any number and forms of mechanical springs, including air springs, can be used. In case a draw spring is used as an energy storage, there is advantageously provided a form of spring adjustment member for adjusting the spring tension. In this manner of operating the cam-oscillating drive, it is possible to attain the greatest possible averaging of the forces. It is possible to provide either a single adjustment for a given machine rotary speed, or a continuously variable adjustment to fit a variable range of rotary speeds.

The transfer of the forces between the cam follower roller link and the oscillating part can be arranged in various ways. The roller link can be directly connected with the oscillating part, or it can be realized as a four-piece link. In such a four-piece link, the cam roller link is shaped as a double link which can rotate about a fixed pivot point and is linked via an intermediate link and two pivot points with the oscillating part. The oscillating part is similarly rotatable about a fixed pivot point.

The above-described cam-oscillating drive operates to average the cyclical irregularities developed in the drive moments of an oscillating sheet gripper of a rotary sheet printing machine, for which it is especially well suited. In that manner, the oscillating part is directly connected with the initial sheet gripper of the printing machine.

The above-described cam-oscillating drive operates to even out, i.e. averaging the cyclic irregularities in drive moment of an oscillating sheet gripper especially suited for a rotary sheet printing machine. In this application, the oscillating part is directly coupled with the gripper.

In the following, three of the preferred embodiments of the invention are described in more detail in reference to the appended drawing.

Other features which are considered as characteristic for the invention are set forth in the appended claims.

Although the invention is illustrated and described herein as embodied in a cam oscillating drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 6:
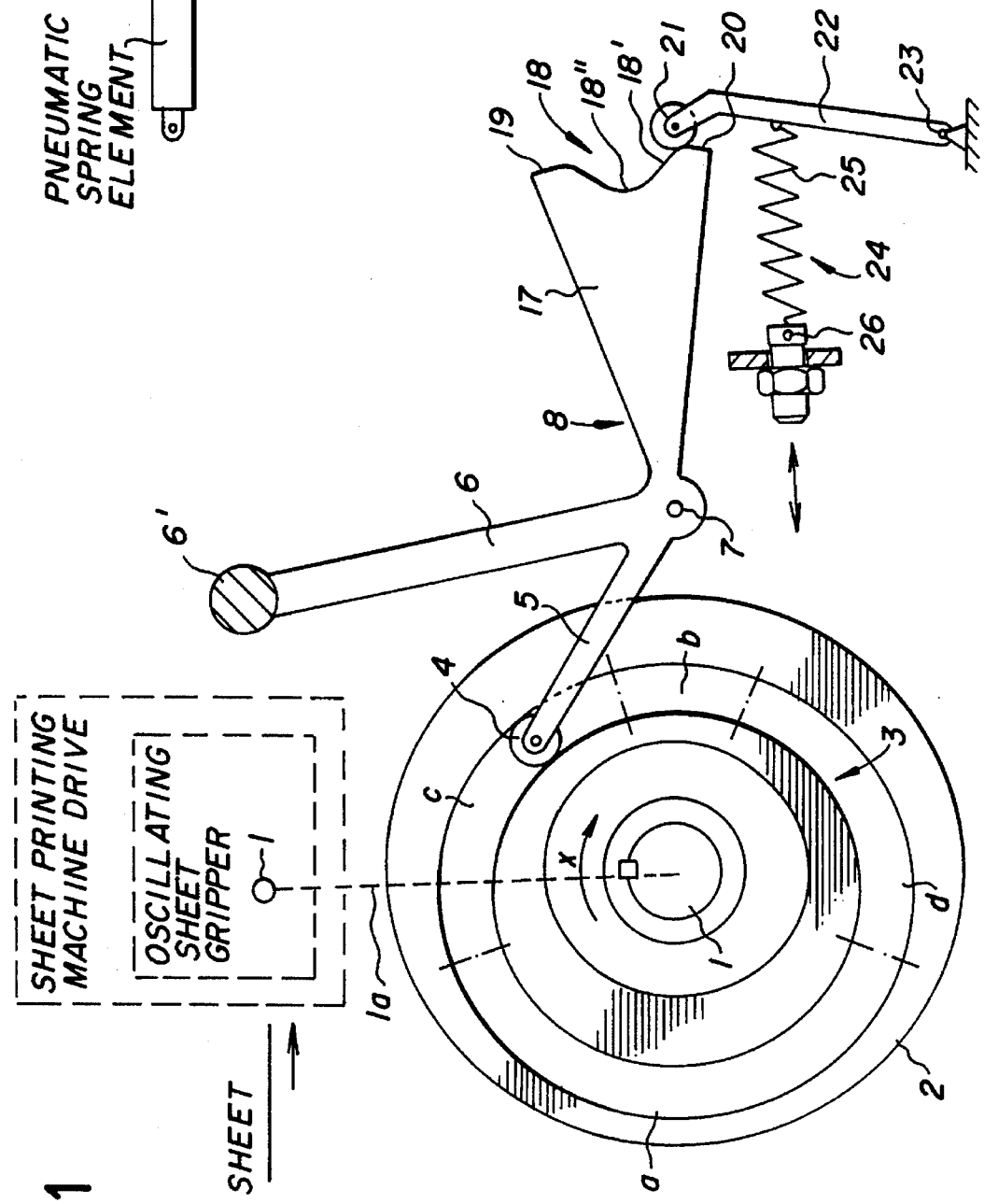
FIG. 1 is a diagrammatic elevational view of the first embodiment of a cam-oscillating drive.
FIG. 6 shows a pneumatic spring element connected with a pivot arm.

According to the embodiment shown in FIG. 1, element 1 is a drive shaft driven by a non-illustrated drive device in the rotary direction shown by arrow X. Rigidly attached to the shaft 1 there is a calm disc 2 having on one side a recessed curve 3. In this exemplary embodiment, the curve 3 is composed of two curve sections a and b that are concentric with the drive shaft 1 and are connected by curve sections c and d. Curve section a is disposed at a greater distance from the center of the shaft 1 than curve section b.

The recessed curve 3, which is recessed into the side of the cam disc 2, serves to receive a cam roller 4 rotatably attached to the freely moving end of a roller link 5, pivotally attached at the other end to pivot point 7, and rigidly attached to an oscillating part 6, having an oscillating mass 6' at its distal end. The mass 6' is selected such as to provide the necessary forces for operation of the sheet gripper.

The oscillating part 6 is rigidly connected at its pivot point 7 with a lever 8, which includes a curve element 17, having a curve 18 having end regions 19, 20 which are nearly concentric with pivot point 7. The curve 18 cooperates with a curve roller 21 attached at a free end of a pivot arm 22, pivotally attached at the other end to pivot point 23. A potential energy storage device 24 in the form of a spiral draw spring 25, is attached at one end to the upper part of the pivot arm 22, and at the other end to an adjusting element 26. By axially adjusting the adjusting element 26 as indicated by the double arrow, the spring tension of spring 25 can be adjusted to match the machine rotary speed.

Since the energy storage 24 serves to average or even out kinetic energy, it is necessary to adjust it to either a constant rotary speed of the machine, or continuously adjust it to the varying rotary speed. This adjustment is performed by means of the spring tension. In case the drive shaft 1 of the cam disc 2 rotates in direction of the arrow X, the oscillating part 6 is set in cyclic back and forth motion phases by means of the cam roller 4 on the roller link 5 when the cam roller 4 traverses the curve section c in clock-wise direction from left to right. Conversely, in curve section d, the motion is from right to left. Between these two phases, the roller link 5 is controlled by the concentric curve sections a and b. In the two motion phases, the oscillating part is first accelerated and then decelerated. In the acceleration phase, the potential energy storage 24 changes from a high energy level in tensioned condition to a low energy level in relaxed condition. In the deceleration phase, the potential energy storage again goes into a high energy level. Due to the alternating exchange between kinetic and potential energy of the oscillating part 6, the forces between the cam roller 4 and the recessed curve 3 is significantly reduced. Whenever the cam roller 4 traverses the curve section b, the oscillating part 6 with oscillating mass 6' remains stationary. In that state, the curve roller 21 remains in the end region 20. As soon as the cam roller 4 enters the curve section c, the curve roller 21 moves into the curve section 18', so that the potential energy so far stored in the energy storage 24 is reduced as the oscillating part 6 moves clockwise. The torque created in this manner counteracts the driving moment, so that the contact pressure between the cam roller 4 and the cam disc, i.e. the recessed curve 3, remains relatively low. When the cam roller 4 traverses the center of the curve section c, the curve valley 18" is reached by curve roller 21, and the energy storage 24 is at its lowest energy level. At reaching the curve sections a, the curve roller 21 reaches the other high point of the curve 18, near the region 19, and the potential energy storage 24 is again charged up.

Figure 2:
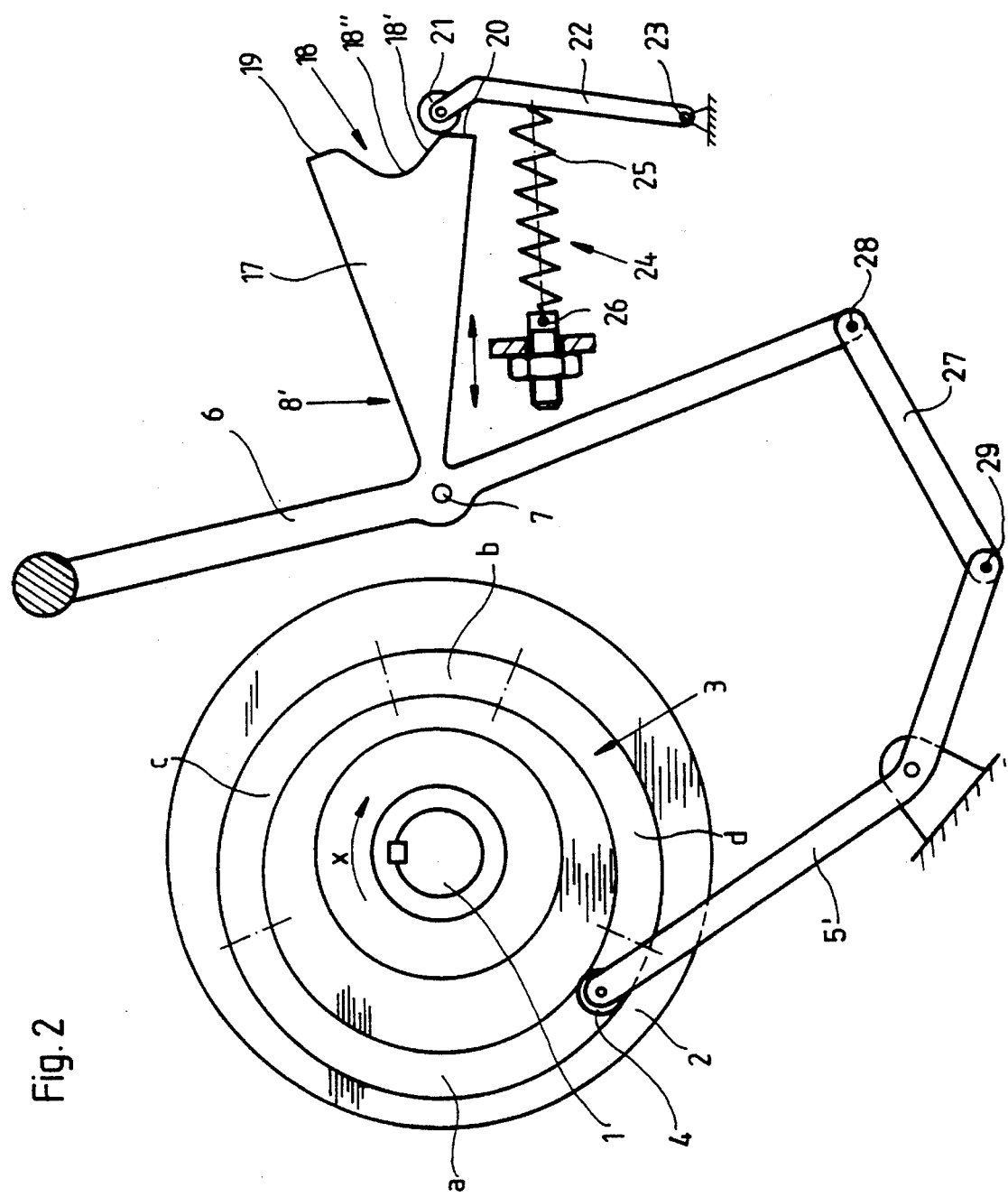
FIG. 2 is a diagrammatic elevational view of a second embodiment of a cam-oscillating drive with a four-section linkage.

FIG. 2 shows an embodiment wherein similar elements have reference numerals similar to those of FIG. 1. Different, however, is the roller link 5, in FIG. 2 shown as double-armed roller link 5', which is pivotally attached to pivot point 7'. This double-armed roller link 5' is coupled via an intermediate link 27 and two pivot points 28, 29 with the oscillating part 6, which is similarly pivotally attached to pivot point 7 In operation, the four-element linkage 5', 27, 6 operates in similar manner as the apparatus shown in FIG. 1.

Figure 3:
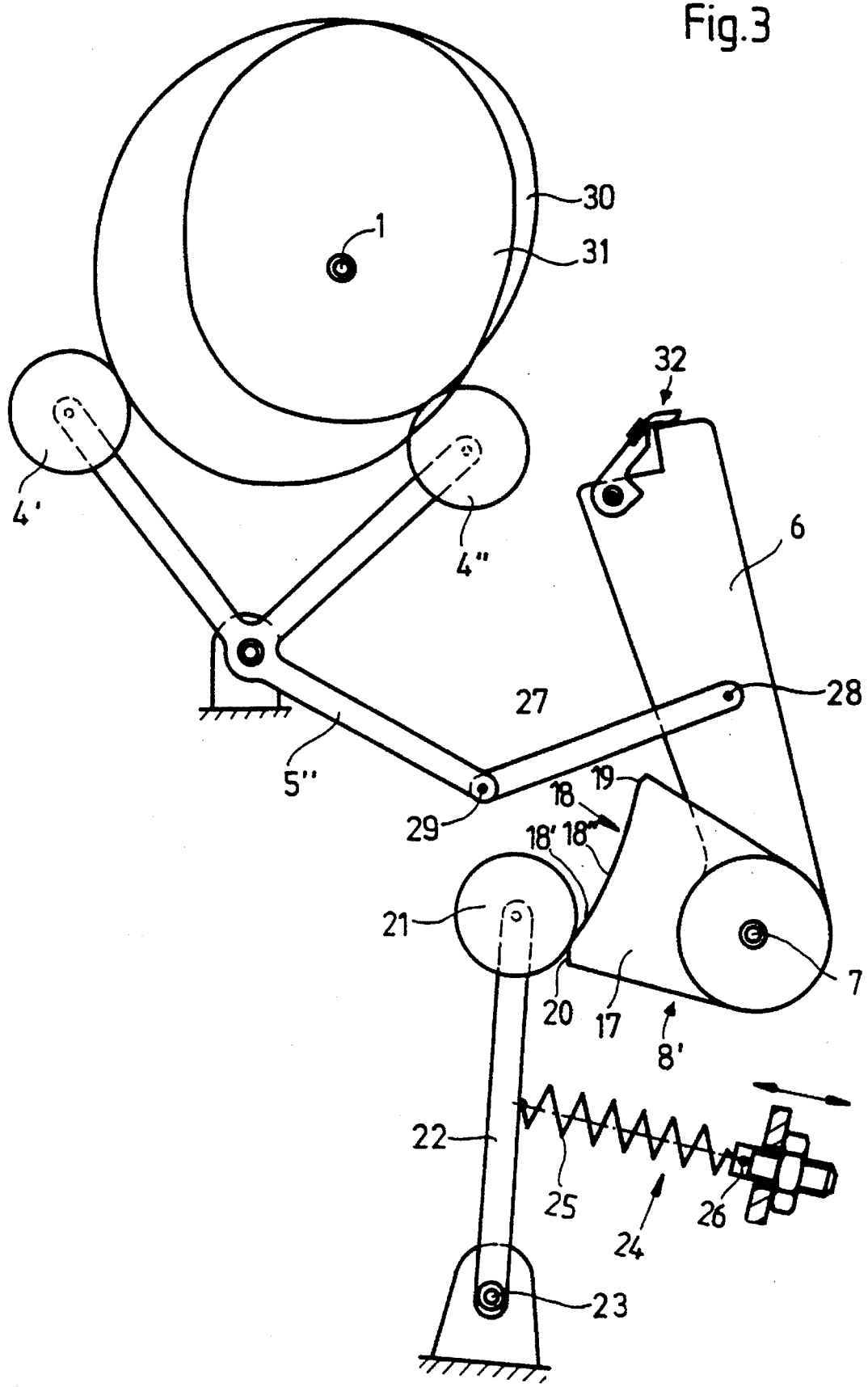
FIG. 3 is a diagrammatic elevational view of an embodiment with two cam discs.

The embodiment shown in FIG. 3 again has similar elements similarly numbered. In this embodiment, however, two cam discs 30 and 31 are mounted on the drive shaft 1. These two cam discs 30 and 31 are contacted by two cam rollers 4' and 4", which are angularly displaced in the respective planes of the two cam discs 30, 31, and mounted on a roller link 5", such that each cam disc 30, 31 cooperates with its respective cam roller 4' and 4". Due to their angular displacement and cooperation with their respective cam discs 30, 31 and further due to the particular shape of the two cam discs 30, 31, the resulting effect is that the rise in one of the cam rollers is coordinated with a corresponding sinking of the other cam roller. In this embodiment, a pre-sheet-gripper 32 is indicated, which is directly connected with the oscillating part 6, which results in the desired movement for transporting the sheet. It follows that this pre-gripper may be positioned on a separate carrier which is connected with the oscillating part 6.

Figure 5:
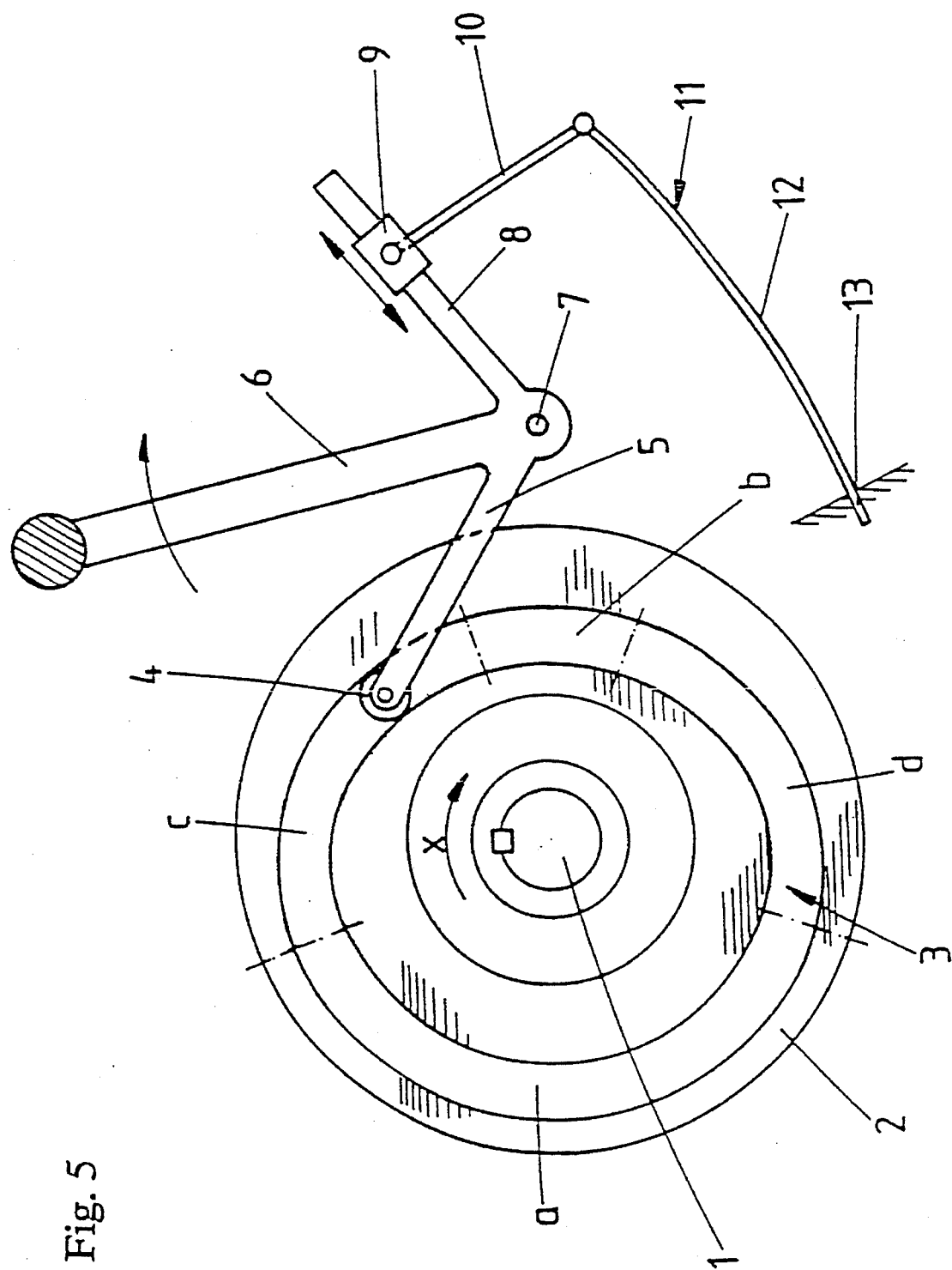
FIG. 5 shows an embodiment having a leaf spring for storing potential energy.

In FIG. 5, there is seen an embodiment having a drive shaft 1, which is rotated in the direction of an arrow X by a non-illustrated drive unit. A plate or disk 2 is non-rotatably seated on the drive shaft 1. The disk 2 includes a grooved cam 3 on one of its end faces. In the embodiment illustrated in FIG. 5, the grooved cam 3 is composed of two cam sections a and b, extending concentrically with respect to the drive shaft 1. The cam sections a and b are connected to one another via cam sections c and d. The cam section a is at a greater distance from the center axis of the shaft 1 than the cam section b. Furthermore, the cam section c is shorter than the cam section d.

A sensor roller 4 projects into the grooved cam 3. The diameter of the sensor roller 4 is adapted to the width of the groove of the cam 3. The sensor roller 4 is mounted on the free end of a roller lever 5, which is permanently connected to the bearing-side of an oscillating part 6. The oscillating part 6 may be, for instance, a gripper on a sheet-fed rotary printing press. The oscillating part 6 is rotatably disposed in a machine frame, such as for example a printing press housing, at a bearing pin 7.

It is apparent that the cam 3 and the oscillating part 6 cooperate in a force-locking manner. A force-locking connection is one which connects two elements together by force external to the elements, as opposed to a form-locking connection which is provided by the shapes of the elements themselves.

Also connected to the bearing-side end of the oscillating part 6 is a lever 8. On the lever 8, there is seated displaceably, yet lockably, a slide 9. The slide 9 allows for varying the effective length of power arm of the lever 8. One end of a coupler or connecting rod 10 is swivellably connected to the slide 9. The other end of the connecting rod 10 engages with an energy storage device 11, which in the embodiment illustrated in FIG. 1, is in the form of a plate or leaf spring 12. One end of the leaf spring 12 is fixedly clamped at 13, while the other end is suitably connected to the free end of the connecting rod 10.

Figure 4:
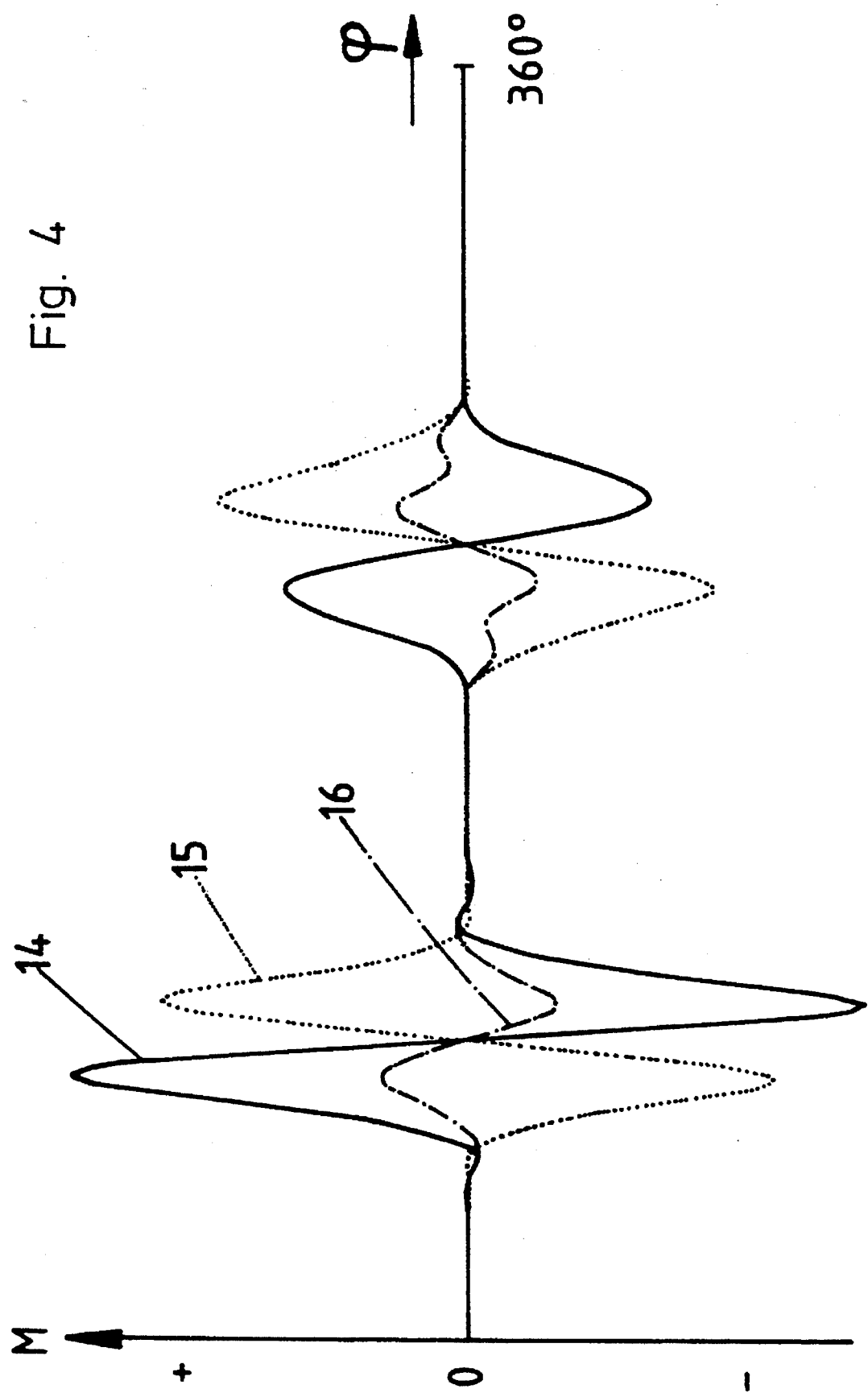
FIG. 4 is a diagram of the time-dependent function of the moment-averaging effect of the invention.

FIG. 4 shows a diagram of the superimposition of the torque alternations. The ordinate M of the diagram shows the torque, and the abcissa shows a full 360° revolution of the angular rotation of the shaft 1. The curve shown in full line 14 shows the drive moment of kinetic energy, while the dotted curve 15 shows the drive moment of potential energy. The sum of the two moments is shown as the dash-dot line 16. The curve 16 shows that the peaks of the line 16 are relatively close to the abcissa both in positive and negative direction.

I claim:

1. In combination, a rotary printing machine, and a drive comprising a drive shaft being supplied with rotary energy, at least one cam disc disposed on the drive shaft, and a cam roller contacting the cam disc, kinetic energy storing means including an oscillating mass for storing kinetic energy during an acceleration phase of said drive, an oscillating part for supporting said oscillating mass, the oscillating part having an oscillating curve section, a curve roller contacting said curve section, potential energy storing means in operative engagement with said curve roller, adjustment means connected to said potential energy storing means for adjustably storing potential energy during a deceleration phase of said drive, first linkage means including said oscillating curve section operatively coupling said kinetic energy storing means with said potential energy storing means for transferring kinetic energy to said potential energy storing means during the deceleration phase and for transferring potential energy to said kinetic energy storing means during the acceleration phase, and second linkage means operatively connecting said cam roller with said kinetic energy storing means.

2. A cam-oscillating drive according to claim 1, including a pivot arm having one end supporting said curve roller, pivotally supported at the other end, a draw spring in said adjustable energy storage device, said draw spring having a tensioned state and an opposite relaxed state, attached to said pivot arm for bracing said curve roller against said curve section, said curve section having a shape such that said draw spring enters the relaxed state during the acceleration phase of said drive, and the tensioned state during the deceleration phase of said drive.

3. A cam-oscillating drive according to claim 2, including an adjusting member coupled to said draw spring for adjusting the tension of said draw spring.

4. A cam-oscillating drive according to claim 1, including a recessed curve axially recessed into said cam disc for receiving said cam roller.

5. A cam-oscillating drive according to claim 1, including a doublearmed roller link having a first end, pivotally attached to said cam roller and a second end, further linkage means including an intermediate link having a first end pivotally attached to said second end of said doublearmed roller link, and a second end pivotally attached to said oscillating part, said doublearmed roller link having an intermediate pivot point pivotally connected to frame.

6. Cam oscillating drive according to claim 1, wherein said potential energy storing means include an air spring.

7. Cam oscillating drive according to claim 1, wherein said second linkage means include a roller link having two arms each rotatably supporting a respective one of said cam rollers, said roller link having a first hinge pivotally connecting said roller link to frame, and a second hinge; an intermediate link having a first end pivotally connected to said second hinge of said roller link, and a second end pivotally connected to said kinetic energy storing means.

8. Cam oscillating drive according to claim 1, wherein said cam disc includes a recessed curve for receiving said cam roller.

9. Cam oscillating drive according to claim 1, wherein said potential energy storing means include a tensioning spring for preadjusting said potential energy storing means.

10. Cam oscillating drive according to claim 1, wherein said potential energy storing means include a leaf spring.

11. Cam oscillating drive according to claim 1, wherein said oscillating curve section includes two end regions and a curve valley between said end regions.

12. Cam oscillating drive according to claim 1, wherein said potential energy storing means include a pneumatic spring element.

13. Cam oscillating drive according to claim 1, wherein said potential energy storing means include a torsion bar.

14. In a rotary sheet printing machine having an oscillating sheet gripper, a gripper device comprising a drive for the oscillating sheet gripper of the sheet printing machine, the drive having an acceleration phase and a deceleration phase, the drive including a drive shaft, at least one cam disc mounted on the drive shaft, a respective cam following cam roller engaging the cam disc, an oscillating part in operative engagement with the cam roller, an oscillating mass connected with the oscillating part, a curve element connected with the oscillating part having an oscillating curve section, a curve roller in rolling engagement with said oscillating curve, adjustable potential energy storing means in operative engagement with the curve roller, said oscillating mass cooperating with said adjustable potential energy storing means such that potential energy stored in said potential energy storing means is converted during the acceleration phase into kinetic energy in said oscillating mass and reversed to potential energy in said potential energy storing means during the deceleration phase of said drive, and adjusting means in operative engagement with said adjustable potential energy storing means, wherein said adjusting means are adjusted so that the difference between accelerating rotary moments and decelerating rotary moments acting on said drive during operation of the drive are reduced to a minimum including first and second cam discs disposed on said drive shaft, first and second cam rollers in operative engagement with said first and second cam discs, said first and second cam rollers having angular offset and being disposed in respective planes of said cam discs, said cam discs having shapes such that as one of said cam rollers rise, the other cam roller correspondingly sinks and second linkage means operatively connecting said first and second cam rollers with said oscillating mass.

15. Cam oscillating drive according to claim 14, including a sheet-gripper connected with said oscillating part for gripping a sheet in said printing machine.

16. Cam oscillating drive according to claim 14, including a sheet gripper forming a part of said oscillating mass for gripping a sheet in said printing machine.

17. Cam oscillating drive according to claim 14, including a roller link having a distal end, and an intermediate link having a first end pivotally connected with said distal end and a second end pivotally connected with said oscillating part.

18. In a rotary sheet printing machine having an oscillating sheet gripper, a gripper device comprising a drive for the oscillating sheet gripper of the sheet printing machine, the drive having an acceleration phase and a deceleration phase, the drive including a drive shaft, at least one cam disc mounted on the drive shaft, a respective cam following cam roller engaging the cam disc, an oscillating part in operative engagement with the cam roller, an oscillating mass connected with the oscillating part, a curve element connected with the oscillating part having an oscillating curve section, a curve roller in rolling engagement with said oscillating curve, adjustable potential energy storing means in operative engagement with the curve roller, said oscillating mass cooperating with said adjustable potential energy storing means such that potential energy stored in said potential energy storing means during the acceleration phase is converted to kinetic energy in said oscillating mass and reversed to potential energy in said potential energy storing means during the deceleration phase of said drive, and adjusting means in operative engagement with said adjustable potential energy storing means, wherein said adjusting means are adjusted so that the difference between accelerating rotary moments and decelerating rotary moments acting on said drive during operation of the drive are reduced to a minimum, wherein said adjustable potential energy storing means include a pneumatic spring element.

19. In a printing machine having a drive shaft with cyclically occurring fluctuations in the drive torque, the improvement comprising a cam operatively engaging the drive shaft, an oscillating part driven by said cam and having an oscillating motion with points of inflection, a potential energy storing device operatively engaging said oscillating part so as to at least partly compensate for said fluctuations, said potential energy storing device having maximum loading at the points of inflection.

20. In a rotary sheet printing machine having an oscillating sheet gripper, a gripper device comprising a drive for the oscillating sheet gripper of the sheet printing machine, the drive having an acceleration phase and a deceleration phase, the drive including a drive shaft, at least one cam disc mounted on the drive shaft, a respective cam following cam roller engaging the cam disc, an oscillating part in operative engagement with the cam roller, an oscillating mass connected with the oscillating part, a curve element connected with the oscillating part having an oscillating curve section, a curve roller in rolling engagement with said oscillating curve, adjustable potential energy storing means in operative engagement with the curve roller, said oscillating mass cooperating with said adjustable potential energy storing means such that during the acceleration phase potential energy stored in said potential energy storing means is converted to kinetic energy in said oscillating mass and during the deceleration phase reversed to potential energy in said potential energy storing means, and adjusting means in operative engagement with said adjustable potential energy storing means, wherein said adjusting means are adjusted so that the difference between accelerating rotary moments and decelerating rotary moments acting on said drive during operation of the drive are reduced to a minimum.

21. Cam oscillating drive according to claim 20, including a pivot point and wherein said oscillating part is pivotally attached to said pivot point.

22. In a rotary sheet printing machine having an oscillating sheet gripper, a gripper device comprising a drive for the oscillating sheet gripper of the sheet printing machine, the drive having an acceleration phase and a deceleration phase, the drive including a drive shaft, at least one cam disc mounted on the drive shaft, a cam following cam roller engaging the cam disc, an oscillating part in operative engagement with the cam roller, an oscillating mass connected with the oscillating part, adjustable potential energy storing means in operative engagement with the oscillating part, said oscillating mass cooperating with said adjustable potential energy storing means such that during the acceleration phase potential energy stored in said potential energy storing means is converted to kinetic energy in said oscillating mass and during the deceleration phase of said drive reversed to potential energy in said potential energy storing means, adjusting means in operative engagement with said adjustable potential energy storing means, a lever rigidly connected to said oscillating part, wherein said adjustable potential energy storing means include a leaf spring having a free end, and a connecting rod adjustably and swivellably connected to said lever and to said free end.

23. Cam oscillating drive according to claim 22, including slide means slidably connected with said lever and a connecting rod having one end connected with a free arm of said leaf spring, and another end connected with said slide means for varying effective length of said lever.

* * * * *